United States Patent Office 3,005,749
Patented Oct. 24, 1961

3,005,749
METHOD FOR IMPROVING THE ABILITY OF SOIL TO SUPPORT PLANT GROWTH
Charles R. Youngson, Long Beach, Calif., assignor to The Dow Chemical Company, Midland, Mich., a corporation of Delaware
No Drawing. Filed Feb. 4, 1959, Ser. No. 791,052
11 Claims. (Cl. 167—30)

The present invention is concerned with the treatment of soil or growth media and is particularly directed to a method for the control of soil inhabiting nematodes which attack the underground parts of plants and improving the ability of soil to support plant growth.

It is an object of the present invention to provide an improved method for the treating and disinfection of soil infested with nematodes. A further object is the provision of a method for improving the ability of soil to support plant growth. Other objects will become apparent from the following specification and claims.

The new agronomical practice comprises treating soil or growth media with a phosphate compound corresponding to the formula:

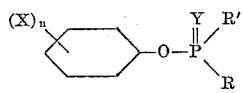

wherein each X represents hydrogen, chlorine, methoxy or methyl; n represents one of the integers 1 and 2; Y represents oxygen or sulfur; R represents amido or lower-alkylamido; and R' represents amido, lower-alkylamido, loweralkoxy or an alkoxyalkoxy radical containing up to 6 carbon atoms. Representative of the alkoxyalkoxy radicals are ethoxymethoxy, methoxyethoxy, methoxypropoxy, ethoxyethoxy, ethoxypropoxy, methoxybutoxy and propoxypropoxy. The expressions lower alkyl and lower alkoxy are employed in the present specification and claims to refer to radicals containing from one to five carbon atoms, inclusive. The new practice has been found to improve the ability of soil to support plant growth and to protect the plants from the ravages of soil dwelling plant pathogenic nematodes which attack their roots. It has been further found that the treatment with the phosphate compounds improves the growth characteristics or crops raised thereon. Thus, crops grown on the treated and improved soil have more luxuriant tops, fruit and roots and are of a greater total weight than those obtained from untreated soil.

The phosphate compounds are crystalline solids or viscous liquids which are somewhat soluble in many organic solvents and of low solubility in water. They are adapted to be readily and conveniently distributed in soil. Further, when so employed, the compounds accomplish a substantially complete kill of nematodes, and induce soil changes which improve the ability of the soil to support plant growth and the growth characteristics of crops raised on the treated soil. It is among the advantages of the present invention that the compounds, while sufficiently persistent to accomplish the desired effect upon the soil and upon the soil inhabiting organisms dissipate in a reasonable period of time.

The distribution of at least a minimum effective dosage of the phosphate compounds in soil is essential and critical for the practice of the present invention. In general, good improvements in the ability of soil to support plant growth and good controls of nematodes are obtained when the compounds are distributed in the soil in the amount of from 0.005 to about 50 parts by weight per million parts by weight of soil. In the preferred practice, the compounds are distributed in the soil in amounts not greater than about 25 parts by weight per million. In field applications, the phosphate compounds may be distributed in the soil at a dosage of from 0.003 to 25 pounds or more per acre and through such a cross section of soil as to provide for the presence therein of an effective concentration of the treating agent. In general field applications, it is usually preferred that the compounds be distributed to a depth of from 3 to 6 inches. Oftentimes, it is desirable to distribute the compounds to a depth of 24 or more inches to avoid reinfestation of the soil from deep dwelling nematodes which cause plant disease.

In one embodiment of the invention, the treated soil is planted with the desired crop plant following the distribution of the phosphate compounds in the soil. Where minimum dosages of the compounds are distributed in soil, the treated soil may be immediately planted with the desired crop. Following the distribution of larger dosages of the phosphate compounds, it is desirable that any planting operation not be carried out for a period of several days, the exact period depending upon the concentration of the phosphate compounds in the soil and the resistance of the plant species concerned to the compound. Where the compounds are employed for the treatment of the soil adjacent to the root systems of established plants having resistance to the phosphate compounds, the existing vegetation is not unfavorably affected by minimum effective concentrations of the phosphate compounds temporarily present in the soil.

The method of the present invention may be carried out by distributing the unmodified phosphate compounds through the growth medium as by impregnation. However, the present method also embraces the employment of a liquid or dust composition containing the toxicants. In such usage, the phosphate compounds may be modified with one or a plurality of additaments or soil treating or parasiticide adjuvants, including water or other liquid carriers, surface active dispersing agents and finely divided inert solids. Depending upon the concentration of toxicant such augmented compositions are adapted to be distributed in the soil, or employed as concentrates and subsequently diluted with additional inert carrier to produce the ultimate treating compositions. The required amount of the phosphate compounds in the growth media conveniently may be supplied per acre treated in from five gallons to five inches or more of the liquid carrier or in from about 20 to 2,000 pounds of the solid carrier.

The exact concentration of the phosphate compounds to be employed in compositions for the treatment of growth media may vary provided the required dosage of effective agent is supplied in the medium. The concentration of toxicant in liquid compositions employed to supply the desired dosage generally is from about 0.000001 to 50 percent by weight, although compositions containing as high as 90 percent may be employed. In dusts, the concentration of toxicant may be from about 0.08 to 20 percent by weight. In compositions to be employed as concentrates, the toxicant may be present in a concentration of from about five to 95 percent by weight.

Liquid compositions containing the desired amount of the phosphate compounds may be prepared by dispersing the toxicant in water with the aid of a suitable surface active dispersing agent such as an ionic or non-ionic emulsifying agent. Such compositions may contain from one or more water immiscible solvents for the phosphate compounds. In such compositions, the carrier comprises an aqueous emulsion, i.e. a mixture of water immiscible solvent, emulsifying agent and water. The choice of dispersing and emulsifying agent and the amount thereof employed is dictated by the nature of the composition type and by the ability of the agent to facilitate the dispersion of the phosphate compounds in the aqueous carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the phosphate compounds are dispersed in and on a finely divided inert solid such as talc, chalk, gypsum and the like. In such operations, the carrier is mechanically ground with the compound or wet with a volatile organic solvent solution thereof. Similarly, dust compositions containing the compounds may be prepared from various of the solid surface active dispersing agents, such as bentonite, fuller's earth, attapulgite and other clays. Depending upon the proportions of ingredients, these dust compositions may be employed as concentrates and subsequently diluted with additional solid surface active dispersing agent or with talc, chalk or gypsum and the like to obtain the desired amount of active ingredient in a composition adapted to be employed for the treatment of soil. Also, such concentrate dust compositions may be dispersed in water with or without the aid of a dispersing agent to form aqueous soil treating compositions.

When operating in accordance with the present invention, the soil may be impregnated with the phosphate compounds, or a composition containing the toxicants, in any convenient fashion, e.g. by simple mixing with the soil, by applying to the surface of soil and thereafter dragging or discing into the soil to the desired depth or by employing water to accomplish the penetration and impregnation. In a preferred procedure, the impregnation is carried out with the water employed to irrigate the soil.

The expressions "growth media" or "soil" are employed in the present specification and claims in their broadest sense to be inclusive of all conventional "soils," as defined in Webster's New International Dictionary, Second Edition, Unabridged, published in 1937 by G. and C. Merriam Company, Springfield, Massachusetts. Thus, the terms refer to any substances or media in which vegetation may take root and grow, and are intended to include not only earth but compost, manure, muck, humus, and sand and the like, adapted to support plant growth.

The following examples illustrate the invention but are not to be construed as limiting the same.

*Example 1*

An acetone solution containing 100 grams of various of the phosphate compounds per liter of solution was dispersed in water to prepare aqueous compositions containing 0.1 part by weight of one of the phosphate compounds per million parts by weight of ultimate mixture. These compositions were employed for the treatment of seed beds of sandy loam soil which were heavily infested with root knot nematodes. The soil was of good nutrient content and contained about 58 percent sand, 27 percent silt and 15 percent clay. In the treating operations, the aqueous compositions were applied to the seed beds as a soil drench and in an amount sufficient to supply 0.146 pound of one of the phosphate compounds per acre foot of soil. The latter dosage corresponds to a concentration of about 0.05 parts by weight of phosphate compound per million parts by weight of soil. Following the treating operations, the average soil temperature remained at about 62° F. for the period of the determination.

One week after treatment, the seed beds were planted with cucumber seeds. Adjacent untreated seed beds were also planted with cucumber seeds to serve as checks. During the subsequent growing period there was observed no adverse effect upon the germination and growth of seedlings attributable to the presence of phosphate compound. About 5 weeks after planting, the plants were lifted from the soil and the roots washed and examined for gall formation attributable to nematode attack to determine what percent kill of nematodes had been obtained in the treated soil. The phosphate compounds employed and results obtained are set forth in the following table:

| Test Compound | Percent Kill of Nematodes |
|---|---|
| O-(4-Chloro-2-methylphenyl) O-methyl N-methyl phosphoroamidate | 83 |
| O-Phenyl N,N'-dimethyl phosphorodiamidate | 83 |
| O-(4-Chlorophenyl) N,N'-dimethyl phosphorodiamidate | 91 |
| O-(4-Chlorophenyl) N,N'-diethyl phosphorodiamidothioate | 85 |

At the time of the observations, the plants from the untreated check beds were found to be stunted and dwarfed, and their roots heavily covered with galls attributable to the attack of root knot nematodes.

*Example 2*

An acetone solution containing 100 grams of various of the phosphate compounds per liter of solution was dispersed in water to prepare aqueous compositions containing about 0.3 part by weight of one of the phosphate compounds per million parts by weight of ultimate mixture. These compositions were employed in an exactly comparable operation for the treatment of seed beds containing a very heavy infestation of root knot nematodes. In the treating operations, the aqueous compositions were applied to the seed beds as a soil drench and in an amount sufficient to supply 0.44 pound of one of the phosphate compounds per acre foot of soil. The latter dosage corresponds to a concentration of about 0.17 part by weight of phosphate compound per million parts by weight of soil.

One week after treatment, the seed beds were planted with cucumber seeds. Adjacent untreated seed beds were also planted with cucumber seeds to serve as checks. During the subsequent growing period, there was observed no adverse effect upon the germination and growth of seedlings attributable to the presence of phosphate compound. About five weeks after planting, the plants were lifted from the soil and the roots washed and examined for gall formation attributable to nematode attack to determine what control of nematodes had been obtained in the treated soil. The phosphate compounds employed and results obtained are set forth in the following table:

| Test Compound | Percent Kill of Nematodes |
|---|---|
| O-Phenyl O-ethyl N-methyl phosphoroamidate | 89 |
| O-(4-Chlorophenyl) O-ethyl N-methyl Phosphoroamidate | 100 |
| O-(4-Chloro-2-methylphenyl) N,N'-dimethyl phosphorodiamidate | 100 |
| O-(2-Chlorophenyl) O-methyl N-isopropyl phosphoroamidate | 95 |
| O-(2,4-Dichlorophenyl) O-methyl N,N-dimethyl phosphoroamidate | 94 |
| O-(2,4-Dichlorophenyl) N,N'-dimethyl phosphorodiamidothioate | 100 |
| O-(3,4-Dichlorophenyl)-N,N'-dimethyl phosphorodiamidothioate | 82 |

At the time of the observations, the plants from the untreated check beds were found to be dwarfed and their roots covered with galls attributable to the attack of root knot nematodes.

*Example 3*

An acetone solution containing 100 grams of various of the phosphate compounds were dispersed in water to produce compositions containing 40 parts by weight of one of the compounds per million parts by weight of ultimate mixture. These compositions were employed for the treatment of areas of sandy loam soil which were heavily infested with root knot nematodes. The soil was of good nutrient content and contained about 58 percent sand, 27 percent silt and 15 percent clay. In the treating operations the aqueous compositions were applied to the soil areas as a soil drench and at a rate of about 5.75 acre inches of aqueous compositions per acre to supply about 12 pounds of one of the phosphate compounds per acre.

About 10 days after treatment, samples of soil were taken from the treated areas at depths of from 1-3 and from 3-6 inches below the soil surface, the soil samples placed in seed beds and thereafter planted with tomato seeds. Soil samples were also taken in the same fashion from untreated check soil containing the very heavy infestation of root knot nematodes, and the samples thereafter placed in seed beds and planted with tomato seeds. About 7 weeks after planting, the emerged plants were lifted from the soil and their roots washed with water and examined for gall formation attributable to nematode attack to determine the percent kill of nematodes. The phosphate compounds employed together with the percent kill of nematodes obtained at the indicated depths below the soil surface in the described operations are set forth in the following table:

| Test Compound | Percent Kill of Root Knot Nematodes at Indicated Depths in Inches Below Soil Surface | |
|---|---|---|
| | 1-3 | 3-6 |
| O-(4-Chlorophenyl) O-methyl phosphoroamidothioate | 100 | 100 |
| O-(4-Chlorophenyl) O-ethyl phosphoroamidothioate | 100 | 100 |
| O-(4-Chlorophenyl) O-methyl N-methyl phosphoroamidothioate | 100 | 100 |
| O-(3-Methylphenyl) O-methyl phosphoroamidothioate | 100 | 100 |
| O-(4-Methoxyphenyl) O-methyl phosphoroamidothioate | 100 | 100 |
| O-(2-Chloro-4-methylphenyl) O-methyl phosphoroamidothioate | 100 | 100 |
| O-(3,4-dimethylphenyl) O-methyl phosphoroamidothioate | 100 | 100 |

At the time of the observations, the plants from the seed beds prepared from untreated check soil were found to be stunted and their roots covered with galls attributable to the attack of root knot nematodes.

*Example 4*

O-(4-methoxyphenyl) O-butyl N,N-diamyl phosphoroamidothioate, O-(2-chloro-6-methylphenyl) O-(ethoxyethyl) N-propyl phosphoroamidate, O-(2,6-dimethylphenyl) O-methyl N,N-dimethyl phosphoroamidate, O-(3-chlorophenyl) O-(2-methoxypropyl) N,N-diethyl phosphoroamidate, and the phosphate compounds identified in the foregoing examples are each mixed with xylene and a dimeric alkylated aryl polyether alcohol (Triton X-155) to prepare concentrate compositions in the form of emulsifiable liquids containing 50 parts by weight of one of the phosphate compounds, 45 parts of xylene and 5 parts of Triton X-155.

In a further operation O-(4-methylphenyl) N,N-dimethyl phosphorodiamidothioate, O-(3-chlorophenyl) N,N,N',N'-tetrabutyl phosphorodiamidothioate, O-phenyl O-methyl N-methyl phosphoroamidate, O-(4-chlorophenyl) O-methyl N-methyl phosphoroamidate, O-(2,4-dichlorophenyl) O-methyl N-methyl phosphoroamidate, O-(2,4-dichlorophenyl) N,N'-dimethyl phosphorodiamidate, O-(2-chlorophenyl) O-butyl phosphoroamidate and the phosphate compounds identified in the foregoing examples are mixed with xylene and alkyl aryl sulfonate (Octo-700) to produce emulsifiable concentrate composition containing 30 parts by weight of one of the phosphate compounds, 60 parts of xylene and 10 parts of Octo-700.

These emulsifiable concentrate compositions are adapted to be dispersed in water to produce aqueous compositions having very desirable wetting and penetrating properties. The latter aqueous compositions are adapted to be employed to treat soil and distribute the phosphate compounds therein in effective concentrations.

The diamido-phosphate compounds as employed in accordance with the teachings of the present invention may be prepared by reacting one molecular proportion of a suitable O-aryl phosphorodichloridate or O-aryl phosphorodichloridothioate with at least four molecular proportions of ammonia or a suitable alkylamine. The reaction is carried out in an inert reaction medium such as benzene and takes place at temperatures of from 0 to 40° C. with the production of the desired product and ammonium hydrochloride or amine hydrochloride of reaction. Upon completion of the reaction, the reaction mixture is filtered to separate the hydrochloride and the solvent removed from the filtrate by distillation to obtain the desired product as a residue.

The monoamido-phosphate compounds as employed in accordance with the present invention may be prepared by reacting together substantially equal molecular proportions of an O-aryl phosphorodichloridate or O-aryl phosphorodichloridothioate and an alkali metal salt of a suitable alcohol or ether alcohol to produce a diester intermediate. The reaction is usually carried out in the alcohol from which the alcoholate is prepared and takes place at temperatures of from about 10°-40° C. with the production of the desired product and alkali metal chloride. Upon completion of the reaction, the alkali metal chloride is separated by filtration and the reaction medium removed from the filtrate by distillation to obtain the intermediate diester product as a residue. The diester intermediate is thereafter reacted with ammonia or an alkylamine as previously described to produce the desired monoamidophosphate compound.

I claim:

1. An agronomical practice which comprises impregnating nematode infested soil with a nematocidal amount of a phosphate compound corresponding to the formula

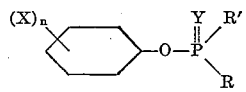

wherein each X represents a member of the group consisting of hydrogen, chlorine, methoxy and methyl, n represents one of the integers 1 and 2, Y represents a member of the group consisting of oxygen and sulfur, R represents a member of the group consisting of amido and lower-alkylamido and R' represents a member of the group consisting of amido, lower-alkylamido, lower-alkoxy and alkoxyalkoxy containing up to 6 carbon atoms.

2. An agronomical practice which comprises impregnating nematode infested soil with a phosphate compound in the amount from 0.005 to 50 parts by weight per million parts by weight of soil, the phosphate compound having the formula

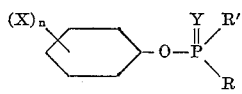

wherein each X represents a member of the group consisting of hydrogen, chlorine, methoxy and methyl, n represents one of the integers 1 and 2, Y represents a member of the group consisting of oxygen and sulfur, R represents a member of the group consisting of amido or lower-alkylamido and R' represents a member of the group consisting of amido, lower-alkylamido, lower-alkoxy and alkoxyalkoxy containing up to 6 carbon atoms.

3. The method claimed in claim 2 wherein the impregnation is carried out at a dosage of from 0.005 to 25 parts by weight per million parts by weight of soil.

4. The method claimed in claim 2 wherein the impregnation is carried out with a composition made up of the phosphate compound in admixture with a soil treating adjuvant as a carrier therefor.

5. An agronomical practice which comprises impregnating nematode infested soil with the phosphate compound at a substantially uniform dosage of at least 0.003 pound per acre, the impregnation being carried out through such a cross section of the soil as to provide for the presence therein of from 0.005 to 25 parts by weight of the phosphate compound per million parts by weight of soil and the phosphate compound having the formula

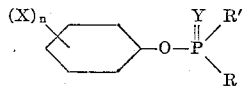

wherein each X represents a member of the group consisting of hydrogen, chlorine, methoxy and methyl, $n$ represents one of the integers 1 and 2, Y represents a member of the group consisting of amido or lower-alkylamido and R' represents a member of the group consisting of amido, lower-alkylamido, lower-alkoxy and alkoxyalkoxy containing up to 6 carbon atoms.

6. An agronomical practice which comprises impregnating nematode infested soil with a nematocidal amount of O-phenyl O-methyl N-methyl phosphoroamidate.

7. An agronomical practice which comprises impregnating nematode infested soil with a nematocidal amount of O-(4-chlorophenyl) O-methyl N-methyl phosphoroamidate.

8. An agronomical practice which comprises impregnating nematode infested soil with a nematocidal amount of O-(2,4-dichlorophenyl) O-methyl N-methyl phosphoroamidate.

9. An agronomical practice which comprises impregnating nematode infested soil with a nematocidal amount of O-phenyl N,N'-dimethyl phosphorodiamidate.

10. An agronomical practice which comprises impregnating nematode infested soil with a nematocidal amount of O-(4-dichlorophenyl) N,N'-dimethyl phosphorodiamidate.

11. An agronomical practice which comprises impregnating nematode infested soil with a nematocidal amount of O-(2,4-dichlorophenyl), N,N'-dimethyl phosphorodiamidate.

References Cited in the file of this patent

UNITED STATES PATENTS

| | | |
|---|---|---|
| 2,377,446 | Payne | June 5, 1945 |
| 2,473,984 | Bickerton | June 21, 1949 |
| 2,502,244 | Carter | Mar. 28, 1950 |
| 2,552,540 | Drake | May 15, 1951 |
| 2,730,547 | Dye | Jan. 10, 1956 |
| 2,743,209 | Jones | Apr. 24, 1956 |
| 2,757,117 | Birum | July 31, 1956 |
| 2,770,638 | Geolito | Nov. 13, 1956 |
| 2,802,021 | Heininger | Aug. 6, 1957 |
| 2,802,818 | Wheeler | Aug. 13, 1957 |
| 2,809,983 | Heininger | Oct. 15, 1957 |
| 2,824,890 | Heininger | Feb. 25, 1958 |
| 2,855,425 | Tolkmith | Oct. 7, 1958 |
| 2,862,018 | Kauer | Nov. 25, 1958 |